United States Patent
Tsubota (10) Patent No.: US 7,751,420 B2
(45) Date of Patent: Jul. 6, 2010

(54) NETWORK SWITCHING METHOD AND APPARATUS, WIRELESS ACCESS APPARATUS, AND WIRELESS NETWORK

(75) Inventor: Azuma Tsubota, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 572 days.

(21) Appl. No.: 11/349,209

(22) Filed: Feb. 8, 2006

(65) Prior Publication Data

US 2006/0195590 A1 Aug. 31, 2006

(30) Foreign Application Priority Data

Feb. 28, 2005 (JP) ............... 2005-053505

(51) Int. Cl.
*H04L 12/54* (2006.01)
(52) U.S. Cl. ............... 370/428; 370/412; 370/328; 370/338; 370/312; 370/429
(58) Field of Classification Search ............... 370/428, 370/429, 412, 328, 338, 312
See application file for complete search history.

(56) References Cited

U.S. PATENT DOCUMENTS

| | | | |
|---|---|---|---|
| 6,996,086 B2 * | 2/2006 | Wolfe et al. ............... | 370/338 |
| 2002/0054574 A1 * | 5/2002 | Beach et al. ............... | 370/279 |
| 2003/0169769 A1 * | 9/2003 | Ho et al. ............... | 370/473 |
| 2003/0235170 A1 * | 12/2003 | Trainin ............... | 370/338 |
| 2004/0131040 A1 * | 7/2004 | Gruhl et al. ............... | 370/349 |
| 2005/0147032 A1 * | 7/2005 | Lyon et al. ............... | 370/229 |
| 2006/0146875 A1 * | 7/2006 | Yang ............... | 370/468 |
| 2006/0153232 A1 * | 7/2006 | Shvodian ............... | 370/468 |

FOREIGN PATENT DOCUMENTS

| | | |
|---|---|---|
| JP | 2000-299703 A | 10/2000 |
| JP | 2003-333053 A | 11/2003 |

OTHER PUBLICATIONS

Handa, "2 IEEE 802.11 hoshiki musen LAN no MAC reiya gijutsu," (MAC layer technology for IEEE 802.11 wireless LANs), CQ Publishing Co., Feb. 2003.

* cited by examiner

*Primary Examiner*—Patrick N Edouard
*Assistant Examiner*—Aung Win
(74) *Attorney, Agent, or Firm*—Rabin & Berdo, P.C.

(57) ABSTRACT

In a wireless network, access points communicate with each other by transmitting and receiving data in first units and with client devices by transmitting and receiving data in second units over wireless links. A first unit encapsulates one or more second units addressed to client devices served by the same access point. Multiple second units encapsulated in a single first unit are transmitted with a single first-unit header. This scheme enables more payload data to be delivered with less overhead than would be required if every second unit were to be encapsulated in a separate first unit.

10 Claims, 5 Drawing Sheets

| MAC ADDRESS | CONNECTED ACCESS POINT /109 |
|---|---|
| 11 : 11 : 11 : 11 : 11 : 01 | NAME OF ACCESS POINT TO WHICH CLIENT DEVICE 11 : 11 : 11 : 11 : 11 : 01 IS CONNECTED |
| 11 : 11 : 11 : 11 : 11 : 02 | NAME OF ACCESS POINT TO WHICH CLIENT DEVICE 11 : 11 : 11 : 11 : 11 : 02 IS CONNECTED |
| 11 : 11 : 11 : 11 : 11 : 03 | NAME OF ACCESS POINT TO WHICH CLIENT DEVICE 11 : 11 : 11 : 11 : 11 : 03 IS CONNECTED |

NETWORK SWITCHING METHOD AND APPARATUS, WIRELESS ACCESS APPARATUS, AND WIRELESS NETWORK

BACKGROUND OF THE INVENTION

1. Field of the Invention

The present invention relates to a switching method and apparatus, a wireless network, and an access point, more particularly to an efficient method of transmitting data between access points in a wireless network.

2. Description of the Related Art

One well-known type of wireless network is a local area network (LAN) accessed through access points that communicate via wireless links with client devices and via wired links with other access points and external networks. A network of this type is constrained to operate in areas where the necessary wired links can be installed. To expand the network's service area, it would be desirable if this constraint could be removed. There is accordingly considerable interest in wireless mesh networks in which access points communicate with each other over wireless links instead of or in addition to wired links.

The communication protocols used on the wired and wireless links of conventional wireless LANs have been standardized within the framework of the Standards for Information Technology of the Institute of Electrical and Electronics Engineers (IEEE). Specifically, communications between access points conform to the IEEE 802.3 family of standards, whereas communications between access points and client devices conform to the IEEE 802.11 family of standards. The two standards use different data formats: IEEE 802.3 communication takes place in basic units referred to as packets; IEEE 802.3 communication takes place in different basic units referred to as data frames. A known way to accommodate the difference is for an access point that receives a data frame from a client device to encapsulate the data frame in a packet for transmission to another access point. When the packet reaches its destination access point, the data frame is de-encapsulated and sent to the destination client device.

As the wireless links in a network multiply, collisions between transmitted data become increasingly likely, and access to the network must be controlled accordingly. In one widely used control method, known as carrier sense multiple access/collision avoidance (CSMA/CA), before transmitting on a wireless channel, a device tests the status of the channel. If the channel is idle, the device proceeds to transmit; if the channel is busy, the device waits awhile, then tests the channel again. CSMA/CA protocols are included in the IEEE 802.11 standards. A Japanese description is given in Handa, '2 IEEE 802.11 hoshiki musen LAN no MAC reiya gijutsu' (MAC layer technology for IEEE 802.11 wireless LANs), CQ Publishing Co., Ltd., February 2003, available online as of Feb. 3, 2005 at http://www.cqpub.co.jp/INTERFACE/toku/2003/200302/toku3.htm.

The IEEE 802.11 standards call for data to be transmitted in frames with a specified interframe space (IFS), which prevents any one device from monopolizing a wireless channel. The standards also specify a back-off algorithm to determine how long a device must wait, after finding that the channel is busy, before attempting to transmit again. The back-off time is randomized to prevent collisions that would occur if multiple access points all began to transmit on an idle channel simultaneously. Similar spacing and back-off requirements are part of the IEEE 802.3 wireless standards.

When each IEEE 802.11 data frame is encapsulated in a separate IEEE 802.3 packet, the need to add a separate IEEE 802.3 header to each packet, and to comply with interframe space and back-off requirements, creates an inefficient flow of data between access points. This is particularly true when the traffic between access points and client devices includes many short data frames, as is the case when telephone calls are transmitted by the Voice over Internet Protocol (VoIP), for example.

SUMMARY OF THE INVENTION

A general object of the present invention is to transmit data efficiently between access points in a wireless network.

A more specific object is to transmit data efficiently over wireless links between access points in a wireless network.

A still more specific object is to transmit data efficiently over wireless links between access points in a wireless local area network.

The invention provides a method of transmitting data over a wireless network in which multiple access points communicate with each other by transmitting and receiving first data units (e.g., packets) and each access point communicates with one or more client devices by wirelessly transmitting and receiving second data units (e.g., data frames).

In the invented method, a plurality of second data units received at a first access point may be encapsulated into a single first data unit. The first data unit is transmitted over the wireless network to a second access point, at which the second data units are de-encapsulated from the first data unit. The second data units are preferably addressed to client devices connected (wirelessly) to the second access point.

This method improves network efficiency because when a plurality of second data units are encapsulated in a single first data unit, instead of in separate first data units, they do not require separate headers and do not have to be spaced apart from each other. Moreover, when a busy channel is detected and the first access point has to wait before transmitting, all of the encapsulated first data units can be transmitted after a single waiting time or back-off time. The first access point does not have to wait separately before transmitting each first data unit, as it might have to if the first data units were encapsulated separately.

The first access point may maintain a queue of first data units destined to client devices connected to the second access point, and assemble the first data unit by taking second data units from the queue. More generally, an access point may maintain one such queue for each other access point in the network.

DETAILED DESCRIPTION OF THE INVENTION

An embodiment of the invention will now be described with reference to the attached drawings, in which like elements are indicated by like reference characters. In this embodiment, access points of the invented type are used in a wireless local area mesh network in which the access points communicate with each other over wireless channels.

Figure 1:
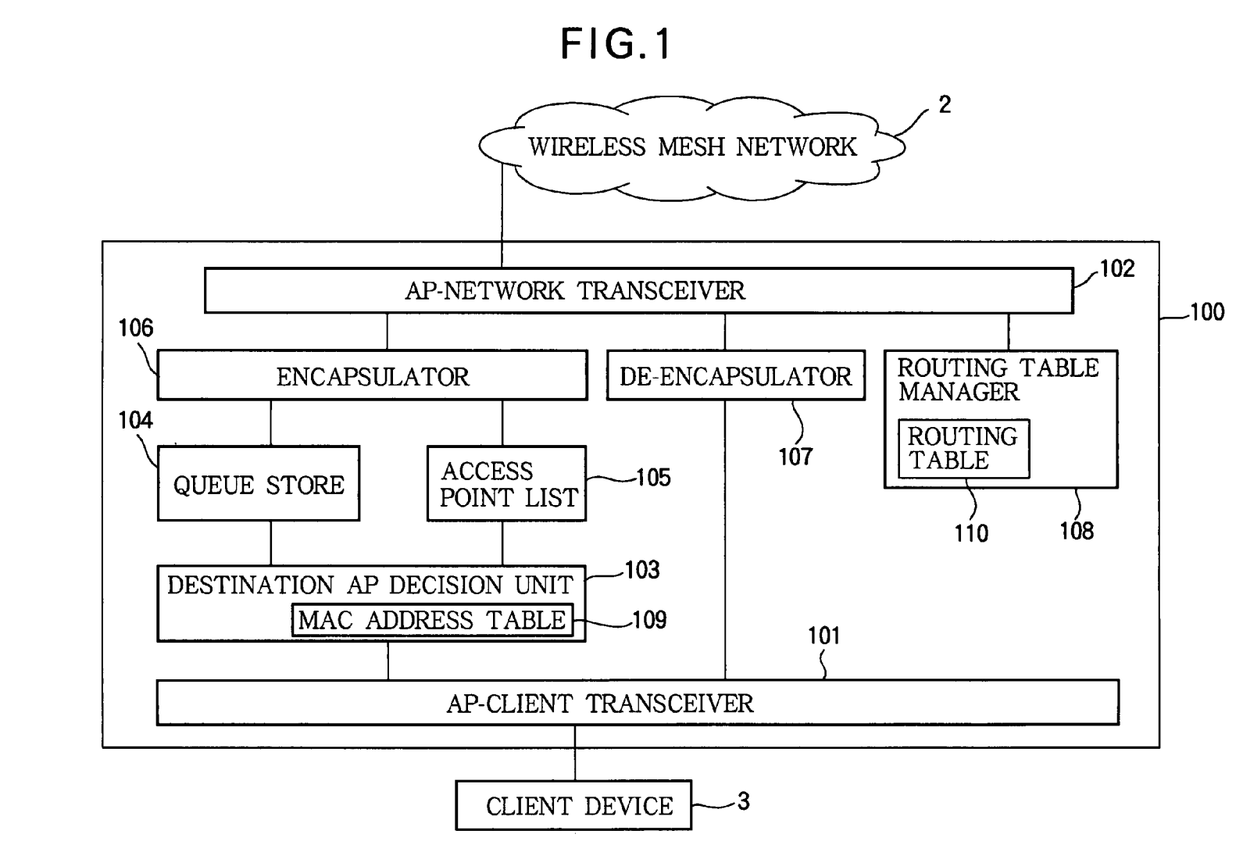
FIG. 1 is a block diagram illustrating the internal structure of an access point in a wireless network embodying the invention.

FIG. 1 shows the internal structure of one access point 100 in the wireless local area mesh network 2. Other access points (not shown) in the network 2 have similar internal structures.

The access point 100 transmits a beacon signal at regular intervals. A client device 3 that receives the beacon signal transmits a signal to the access point 100. By receiving the signal, the access point 100 learns of the presence of the client device 3, so that it can pass data between the client device 3 and the network 2 and control access by the client device 3 to the network 2. In this state the client device 3 is said to be connected to the access point 100.

While connected in this way, the client device 3 communicates with other client devices connected to the same or another access point by transmitting data frames to access point 100. Access point 100 collects data frames addressed to client device connected to each other access point, encapsulates them in packets, and transmits the packets toward their destination over the wireless mesh network 2. When the access point 100 receives a packet from another access point including one or more data frames addressed to the client device 3, it extracts the data frames from the packet and transmits them to the client device 3.

The access point (AP) 100 in FIG. 1 includes switching apparatus comprising an AP-client transceiver 101, an AP-network transceiver 102, a destination access point (AP) decision unit 103, a queue store 104, an access point list 105, an encapsulating unit or encapsulator 106, a de-encapsulating unit or de-encapsulator 107, and a routing table manager 108.

The AP-client transceiver 101 receives data frames transmitted by the client device 3 and either transmits them to other client devices connected to the same access point 100 or converts them to a frame format suitable for transmission to another access point, by removing unnecessary header information, for example. Converted data frames are passed to the destination access point decision unit 103. The AP-client transceiver 101 also receives data frames addressed to client device 3 or another connected client device from the de-encapsulator 107, and transmits these data frames to the client device 3 or other client device.

In this embodiment, the communication protocol used between the AP-client transceiver 101 and the client device 3 conforms to one of the IEEE 802.11 standards (for example, IEEE 802.11a, 802.11b, or 802.11g) and the communication protocol used between access points conforms to an IEEE 802.3 wireless standard. The AP-client transceiver 101 accordingly converts data frames received from the client device 3 in the IEEE 802.11 format by removing information not required in the IEEE 802.3 format.

The AP-network transceiver 102 receives communication packets transmitted from other access points. Packets having access point 100 as their destination access point are passed to the de-encapsulator 107. Other packets are transmitted onward to the next access point on the route to their destination. The AP-network transceiver 102 also receives packets created by the encapsulator 106 and transmits them toward their destination by the prescribed communication protocol.

The destination access point decision unit 103 receives converted data frames from the AP-client transceiver 101. Although the converted data frames have been stripped of unnecessary header information, they still include destination information indicating the client device to which the data frame is addressed. The destination access point decision unit 103 determines the access point to which the destination device is connected and adds each data frame to a corresponding queue in the queue store 104.

The method by which the destination access point decision unit 103 finds the access point connected to the destination device will now be explained.

The destination access point decision unit 103 has a MAC address table 109 that lists all client devices currently connected to the wireless mesh network 2 and the access point to which each client is connected. In this table, client devices are identified by media access control (MAC) addresses built into their hardware; these MAC addresses are also used as destination addresses of data frames. Access points are identified by assigned names. The destination access point decision unit 103 extracts the destination MAC address from a data frame, looks up that MAC address in the MAC address table 109, reads the name of the access point to which the destination device is connected, and decides from the access point name which queue in the queue store 104 should receive the data frame.

All of the access points in the wireless mesh network 2 maintain identical copies of the MAC address table 109. An exemplary method by which this is done will now be explained. In this method, the access point 100 periodically floods the network by simultaneously transmitting information to all other access points. When the access point 100 first detects the presence of client device 3, it floods the network with information associating its own name to the MAC address of client device 3. Each access point that receives this information updates its MAC address table 109 to list the indicated association. As a result, the MAC address management tables 109 at all access points include the same information.

There is no particular restriction on the flooding protocol used. Various protocols are available, such as the optimized link state routing (OLSR) protocol and the ad hoc on-demand and distance vector (AODV) protocol.

Figure 2:
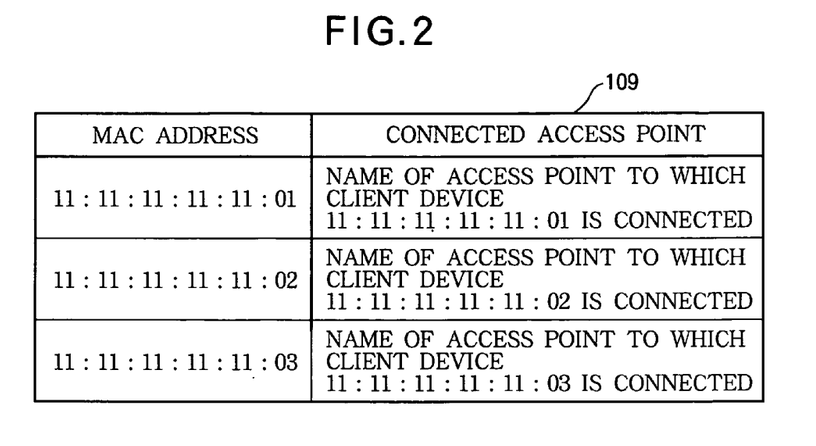
FIG. 2 shows an example of the content of an address management table used in the access point in FIG. 1.

The MAC address table 109 in FIG. 2 has 'MAC address' and 'Connected access point' columns. The MAC address of each client device connected to the wireless mesh network 2 is listed in the 'MAC address' column. The name of the access point to which the client device is connected is listed as the corresponding entry in the 'connected access point' column. The assigned name may be a name assigned when the access point is installed in the wireless mesh network 2, or any other identifying information, such as an Internet protocol (IP) address that can be obtained by query to a domain name server.

When the destination access point decision unit 103 adds a data frame to a queue in the queue store 104 it also checks the access point list 105. If the name of the access point to which the data frame is destined is not already listed in the access point list 105, the destination access point decision unit 103 adds the name of that access point to the bottom of the access point list 105.

The queue store 104 holds data frames destined to each access point in the wireless mesh network 2 in a separate queue. The queue store 104 has one queue for each access point in the network 2.

The access point list 105 functions as a list of queues that determines the order in which data frames are taken from the queue store 104.

To transmit frame data to other access points, the encapsulator 106 extracts all data frames held in the queue in the queue store 104 corresponding to the access point name listed at the top of the access point list 105, or as many data frames as will fit into one packet. To complete the packet, the encapsulator 106 adds header and other information indicating the destination access point of the packet and the next access point on the route to destination access point. The encapsulator 106 obtains the necessary routing information from a routing table 110 (described below) maintained by the routing table manager 108.

Figure 3:
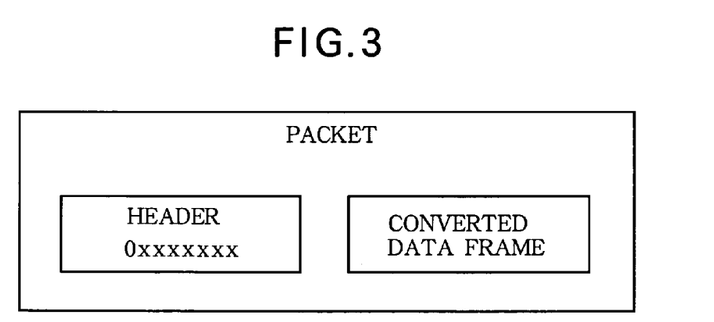
FIGS. 3 and 4 show examples of encapsulated data frames transmitted by the access point in FIG. 1.
Figure 4:
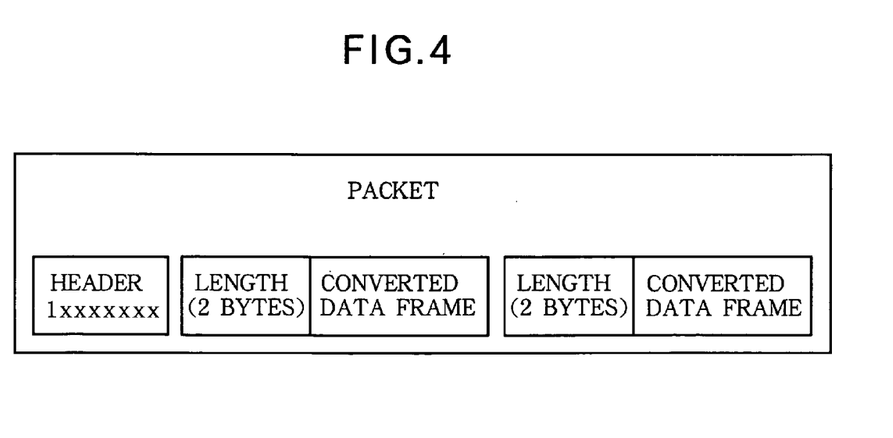

FIG. 3 shows an exemplary packet structure when a single data frame is taken from the queue in the queue store 104; FIG. 4 shows an exemplary packet structure when two data frames are taken. The leading bit distinguishes packets with single data frames from packets with multiple data frames: '0' designates a single data frame and '1' designates a plurality of data frames.

For a single data frame, the packet structure simply includes the unaltered data frame taken from the queue store 104 encapsulated in the packet data area as shown in FIG. 3. When the packet includes a plurality of data frames, as shown in FIG. 4, the data frames are placed one after another in the data area, each preceded by two bytes of information giving the length of the frame. The leading '1' bit informs the destination access point, which will de-encapsulate the data frames, of the presence of this length information.

This frame structure enables multiple data frames taken from a queue in the queue store 104 to be encapsulated in a single packet without a separate packet header for each. The total amount of data to be transmitted is reduced accordingly, as compared with conventional networks that encapsulate each data frame in a separate packet. As a result, the efficiency of the wireless mesh network 2 is improved.

The encapsulator 106 passes each packet it creates to the AP-network transceiver 102, which transmits the packet with all its encapsulated data frames as a single unit. A significant advantage of this encapsulation scheme is that to transmit a plurality of encapsulated data frames, the AP-network transceiver 102 only has to find the wireless channel to the next access point idle once.

The de-encapsulator 107 receives packets addressed to access point 100 from the AP-network transceiver 102, extracts their data frames by stripping off the packet header and length data, converts the data frames back to the IEEE 802.11 format, and passes the converted data frames to the AP-client transceiver 101, which transmits them to their destination client devices.

The routing table manager 108 creates and maintains the above-mentioned routing table 110, which gives information about communication paths that interconnect the access points constituting the wireless mesh network 2. This table 109 is created and maintained on the basis of information received from other access points. The routing table manager 108 may use a proactive routing method such as the method followed in the OLSR protocol, for example, but the invention is not restricted to any particular routing method. A discussion of routing methods will be omitted to avoid obscuring the invention with needless detail.

The client device 3 accordingly communicates with other client devices via the access point 100 by using a prescribed communication protocol. The client device 3 may be any type of device having the necessary communication functions. Applicable devices include notebook-size personal computers equipped with wireless LAN cards conforming to one of the IEEE 802.11 standards, portable computers or computer terminals with built-in IEEE 802.11 wireless communication functions, mobile phones, personal digital assistants (PDAs), and other devices with wireless communication functions, including communication functions using the Japanese Personal Handyphone System (PHS).

When the MAC address table 109 and routing table 110 have been set up in the destination access point decision unit 103 and routing table manager 108, the access point 100 is able to perform the following operations concurrently: (1) receive communication data from the client device 3, (2) transmit communication data to the wireless mesh network 2, and (3) receive communication data from the wireless mesh network 2 and transmit the data to the client device 3. These operations will now be described with reference to the flowcharts in FIGS. 5 to 7.

The access point 100 also has other functions, such as receiving communication data from one access point in the wireless mesh network 2 and transmitting the data to another access point in the wireless mesh network 2, but the following description will be confined to the above operations (1) to (3), which are the operations most relevant to the present invention.

Figure 5:
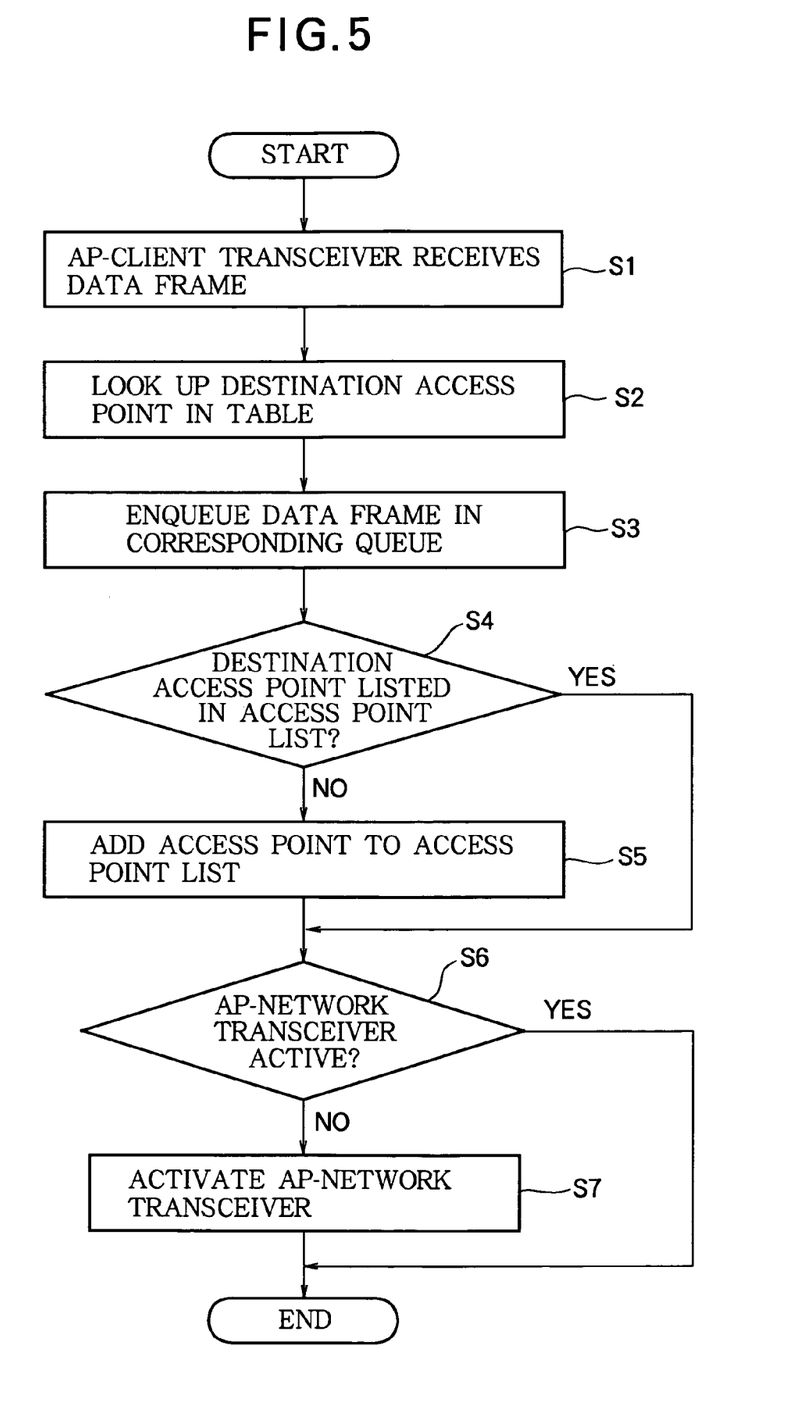
FIG. 5 is a flowchart illustrating the reception of data from a client device at the access point in FIG. 1.

FIG. 5 illustrates the operations performed by the destination access point decision unit 103 when the access point 100 receives a data frame from the client device 3. The data frame is received by the AP-client transceiver 101, which converts the frame data from the IEEE 802.11 format to an IEEE 802.3-compatible format and sends the converted data frame to the destination access point decision unit 103 (S1).

When the destination access point decision unit 103 receives the data frame, it reads the MAC address of the destination client device to which the frame is addressed from the remaining part of the frame header and refers to the MAC address table 109 to find the access point to which the destination client device is connected (S2). For convenience, this access point will be referred to as the destination access point of the data frame, although the true destination of the data frame is of course a client device connected to the destination access point.

When the destination access point has been determined, the data frame is enqueued in the queue store 104 in the queue corresponding to the destination access point (S3).

The destination access point decision unit 103 then checks the access point names in the access point list 105 to see if the destination access point is listed (S4).

If the destination access point is not listed in the access point list 105, the destination access point decision unit 103 adds the name of the destination access point to the bottom of the access point list (S5). If the destination access point is already listed in the access point list 105, the destination access point decision unit 103 skips step S5 and proceeds to step S6. The reason for skipping step S5 if the destination access point is already listed is that the data frame newly added to the queue in the queue store 104 will normally be transmitted when one or more other data frames already present in the same queue are transmitted.

After the destination access point decision unit 103 has checked the access point list 105, it checks whether the AP-network transceiver 102 is currently active (S6). If the AP-network transceiver 102 is already active, the operations performed by the destination access point decision unit 103 to process the received data frame are finished. If the AP-network transceiver 102 is not already active, the destination access point decision unit 103 activates it (S7) and is then finished.

Figure 6:
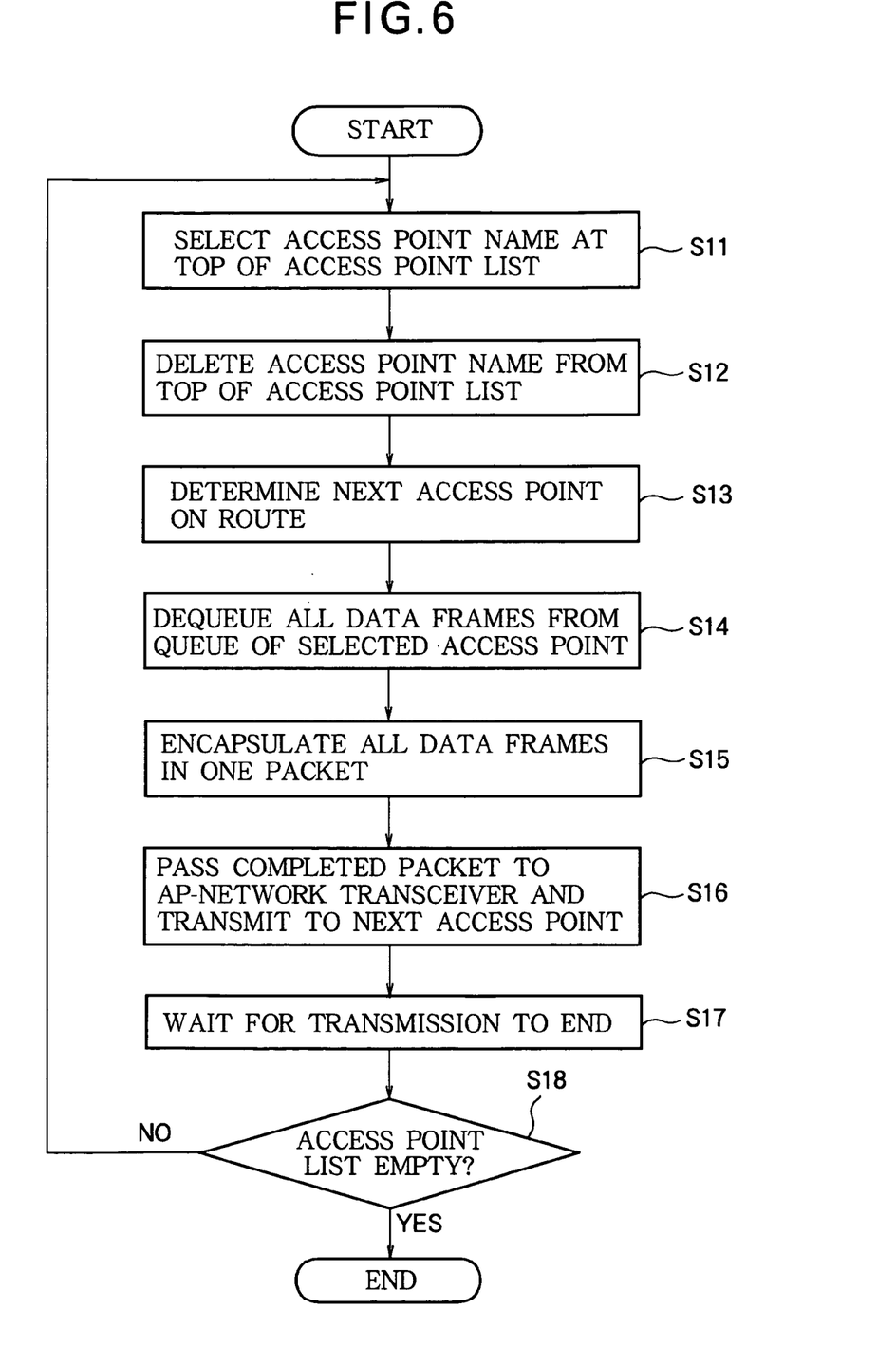
FIG. 6 is a flowchart illustrating transmission of data from the access point in FIG. 1 to the wireless mesh network.

Next, the operations performed by the encapsulator 106 when the AP-network transceiver 102 is active will be described.

Referring to FIG. 6, the encapsulator 106 starts by reading the access point name listed at the top of the access point list

105 (S11). For convenience, this access point will be referred to below as the target access point.

The encapsulator 106 now deletes the target access point name from the access point list 105 (S12).

Next, the encapsulator 106 refers to the routing table 110 maintained by the routing table manager 108 to determine the next access point on the route to the target access point (S13).

If possible, the encapsulator 106 dequeues all data frames enqueued in the queue store 104 in the queue associated with the target access point (S14), and encapsulates them in a single packet having the structure shown in FIG. 3 or FIG. 4 (S15). The destination access point decision unit 103 sets the first bit of the packet header to indicate whether the packet includes one data frame or more than one data frame. Other header bits indicate the target access point and the next access point on the route to the target.

The encapsulator 106 passes the completed packet to the AP-network transceiver 102 (S16). The AP-network transceiver 102 transmits the packet to the next access point on its route, using the CSMA/CA protocol to avoid collisions.

The encapsulator 106 waits for the AP-network transceiver 102 to finish transmitting the packet (S17), then checks the access point list 105 again. If the access point list 105 is empty, the encapsulator 106 deactivates the AP-network transceiver 102 and the encapsulator 106 also becomes idle. If the access point list 105 still includes one or more access point names, the encapsulator 106 returns to step S11 and repeats the above process for the new top access point name on the list.

FIG. 5 describes the operation of the encapsulator 106 when the queue corresponding to the target access point does not include more data frames than can be encapsulated in one packet. If too many data frames are enqueued to be encapsulated in one packet, after step S16, the encapsulator 106 adds the name of the target access point to the bottom of the access point list 105. Alternatively, the encapsulator 106 may omit step S12 and leave the target access point name at the top of the list, although this practice is not normally preferable, because it allows the AP-network transceiver 102 to be monopolized by packets destined to one target access point.

Figure 7:
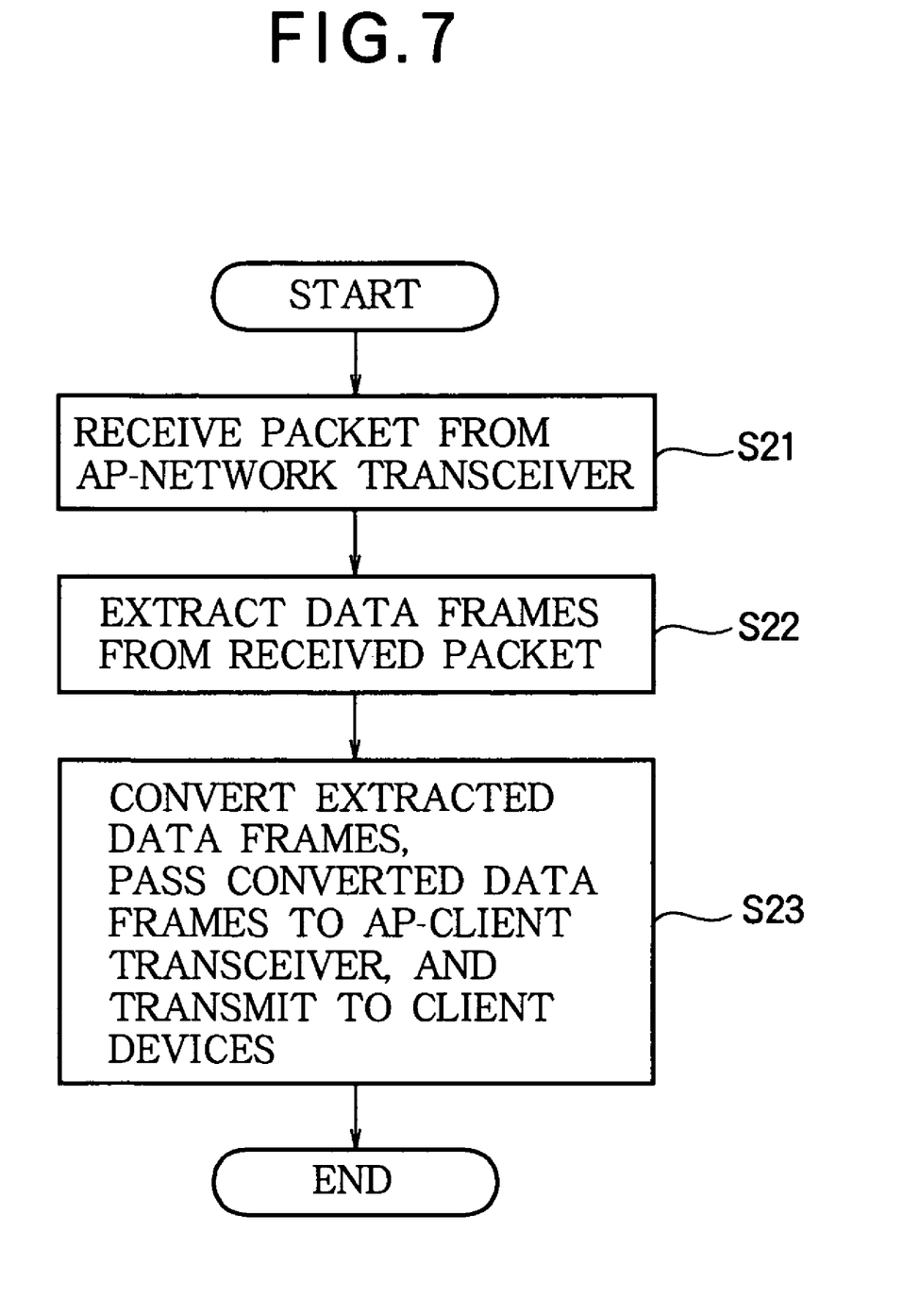
FIG. 7 is a flowchart illustrating the reception of data from the wireless mesh network at the access point in FIG. 1 and transmission of the data to a client device.

Next, the operations performed when the access point 100 is itself the destination access point of a received packet will be described.

Referring to FIG. 7, the AP-network transceiver 102 receives the packet from the wireless mesh network 2 and sends it to the de-encapsulator 107 (S21).

The de-encapsulator 107 extracts the encapsulated data frame or frames from the received packet (S22), using the leading bit of the packet to tell whether the packet contains a single data frame or multiple data frames.

The de-encapsulator 107 converts each extracted data frame to the IEEE 802.11 format and sends the converted data frame to the AP-client transceiver 101, which transmits the data frame to the destination client device (S23).

The procedure described above speeds communication through the wireless mesh network 2 by taking data frames enqueued at a first access point awaiting transmission to client devices connected to a second access point and encapsulating them in a single packet that can be transmitted through the network with a minimum of overhead: that is, with the minimum amount of header information and a minimum of waiting time due to spacing and back-off requirements. As a result, network bandwidth is used efficiently.

The invention is not limited to use of the IEEE 802.11 and 802.3 standards mentioned in the preceding embodiment. A wide variety of communication protocols, settings, and standards are applicable, provided they enable each access point to know what client devices are connected to other access points.

The MAC address table need not have the structure shown in FIG. 3. For example, the table may list both the assigned name and IP address of the access point to which each client device is connected. This scheme makes it possible to manage client devices by their unique MAC addresses but quickly identify the IP address through which they can be reached.

The AP-client transceiver and AP-network transceiver in FIG. 1 may be combined into a single unit in the access point 100 to reduce the size of the access point hardware.

The invention is not restricted to wireless links between access points. Some or even all of the links between access points may be wired.

If packet size is not restricted, the encapsulator may always take all data frames from the queue corresponding to the access point at the top of the access point list.

Conversely, regardless of whether the packet size is restricted or not, the encapsulator may dequeue a number of data frames selected to adjust the packet to a desirable size.

The access point functions described in the preceding embodiment may be realized in either hardware or software, or a mixture of hardware and software.

Those skilled in the art will recognize that further variations are possible within the scope of the invention, which is defined in the appended claims.

What is claimed is:

1. An access point connected to a wireless network, to which multiple access points are connected to communicate with each other by transmitting and receiving signals in a first format and each access point communicates with one or more client devices by transmitting and receiving signals in a second format over a wireless channel;

said access point including:

a management table storing information representing the client devices connected to the access points;

a first communication unit for receiving a signal in the second format from any of the client devices, as a first signal;

a destination access point decision unit for identifying the access point connected to the client device to which the received first signal is addressed, according to address information in a header of the received first signal and by referring to the management table;

a storage unit for storing queues of data frames of first signals which have been received from the client devices connected to the access point, and which have not been transmitted to other access points, each queue containing second data frames addressed to a different access point;

said destination access point decision unit adding the data frame of the received first signal to the corresponding queue;

an access point list listing names of the access points to which the data frames of the first signals which have been received from the client devices connected to the access point, and which have not been transmitted to other access points, are destined in the order in which the data frames destined to the respective access points are received;

said destination access point decision unit checking whether the destination access point to which the data frame of the received first signal is destined is included in the access point list, and adding, if the access point to which data frame of the received first signal is destined is not included in the access point list, the name of the access point to which the data frame of the received first signal is destined, to the bottom of the access point list;

an encapsulator for extracting the name of the access point at the top of the access point list, deleting the extracted name of the access point from the access point list; and placing all the data frames in the queue destined to the access point identified by the extracted name, in a data area of a second signal in the first format; and a second communication unit for transmitting the second signal in the first format to the access point identified by the extracted name.

2. The access point of claim 1, wherein said management table stores the names of the access points and MAC addresses of the client devices connected to each of the access points, obtained by periodically flooding the information among the access points.

3. The access point of claim 2, wherein the management table stores the information obtained by flooding according a version of OLSR (Optimized Link State Routing) protocol, as of the filing date of the instant application, or a version of AODV (Ad Hoc On-Demand Distance Vector) protocol, as of the filing date of the instant application.

4. The access point of claim 1, wherein the first format is a packet-based format, and the second format is data frame-based format.

5. The access point of claim 1, wherein said second communication unit receives a signal in the first format from another access point, as a third signal;

said access point further includes a deencapsulator for converting, when the third signal is addressed to any of the client devices connected to the access point of which the deencapsulator forms a part, one or more data frames according to the first format in the third signal to data frames according to the second format to form a fourth signal, by placing each of the data frames of the received third signal, in a data area of the fourth signal; and said first communication unit transmits the fourth signal to the client device to which the data frame is addressed.

6. A method of controlling communication over a wireless network to which multiple access points are connected;

each access point connected to one or more client devices;

communication between access points being performed by transmitting and receiving signals of a first format, and communication between an access point and a client device is performed by transmitting and receiving signals in a second format over a wireless channel;

each of said access points including a management table storing information representing the client devices connected to the access points;

said method performed in each access point comprising:

a first communication step of receiving a signal in the second format from one of the client devices connected to the access point, as a first signal;

a destination access point decision step of identifying the access point connected to the client device to which the received first signal is addressed, according to address information in a header of the received first signal and by referring to the management table;

a storage step of storing, in a storage unit, queues of data frames of first signals which have been received from the client devices connected to the access point, and which have not been transmitted to other access points, each queue containing second data frames addressed to a different access point;

said destination access point decision step adding the data frame of the received first signal to the corresponding queue;

said destination access point decision step checking whether the destination access point to which the data frame of the received first signal is destined is included in an access point list;

said access point listing names of the access points to which the data frames of the first signals which have been received from the client devices connected to the access point, and which have not been transmitted to other access points, are destined in the order in which the data frames destined to the respective access points are received;

said destination access point decision step adding, if the access point to which data frame of the received first signal is destined is not included in the access point list, the name of the access point to which the data frame of the received first signal is destined, to the bottom of the access point list;

an encapsulation step of extracting the name of the access point at the top of the access point list, deleting the extracted name of the access point from the access point list; and placing all the data frames in the queue destined to the access point identified by the extracted name, in a data area of a second signal in the first format; and a second communication step of transmitting the second signal in the first format to the access point identified by the extracted name.

7. The method of claim 6, further comprising a managing step of managing said management table so that the management table stores the names of the access points and MAC addresses of the client devices connected to each of the access points; said managing step updating the information stored in the management table, by periodically flooding the information among the access points.

8. The method of claim 7, wherein said managing step includes flooding information according a version of OLSR (Optimized Link State Routing) protocol, as of the filing date of the instant application, or a version of AODV (Ad Hoc On-Demand Distance Vector) protocol, as of the filing date of the instant application.

9. The method of claim 6, wherein the first format is a packet-based format, and the second format is a data frame-based format.

10. The method of claim 6, wherein said second communication step receives a signal in the first format from another access point, as a third signal;

said method further includes a deencapsulation step of converting, when the third signal is addressed to any of the client devices connected to the access point where the deencapsulation is performed, one or more data frames according to the first format in the third signal to data frames according to the second format to form a fourth signal, by placing each of the data frames of the received third signal, in a data area of the fourth signal; and said first communication step transmitting the fourth signal to the client device to which the data frame is addressed.

* * * * *